Figure 1:
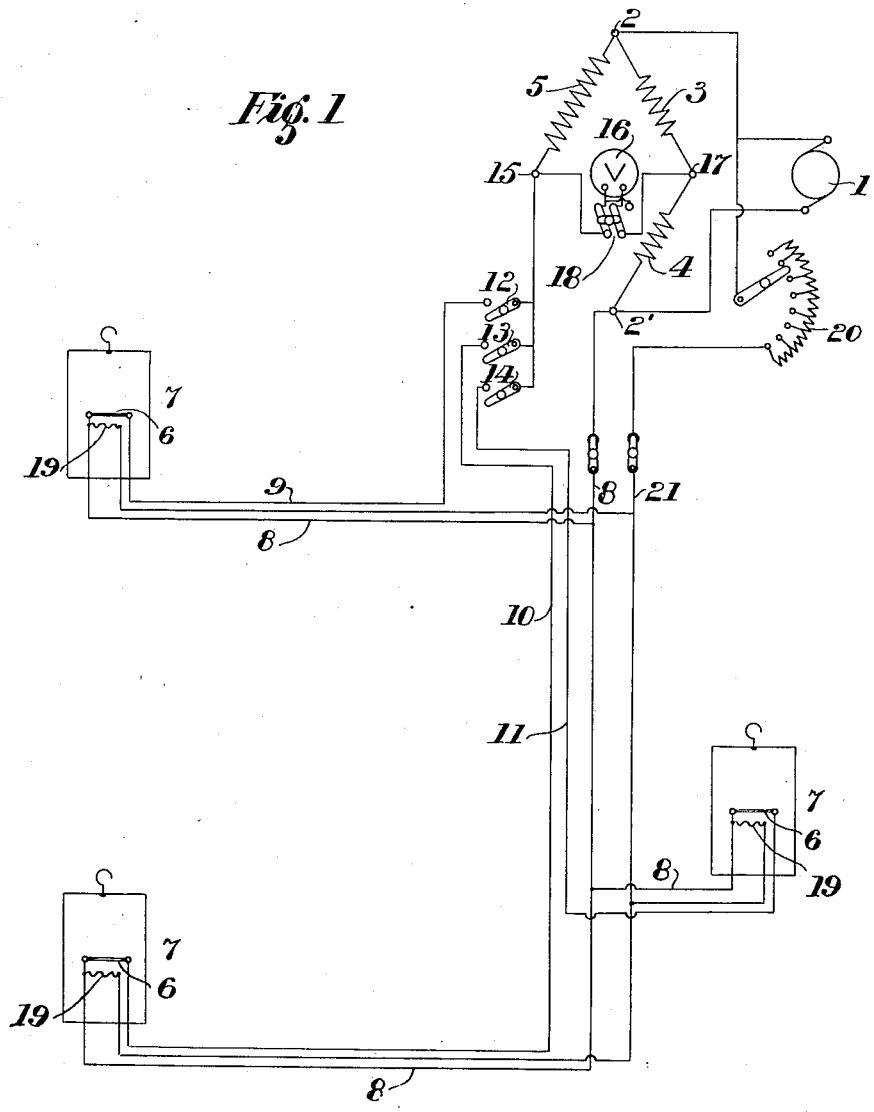

H. H. CLARK.
INDICATING AND MEASURING DEVICE FOR USE IN MINES OR WHEREVER DESIRED TO DETECT PRESENCE OF COMBUSTIBLE GASES.
APPLICATION FILED APR. 5, 1910.

960,823.

Patented June 7, 1910.

2 SHEETS—SHEET 1.

Witnesses:
A. W. Belden
J. W. Paul

Inventor:
Harold H. Clark

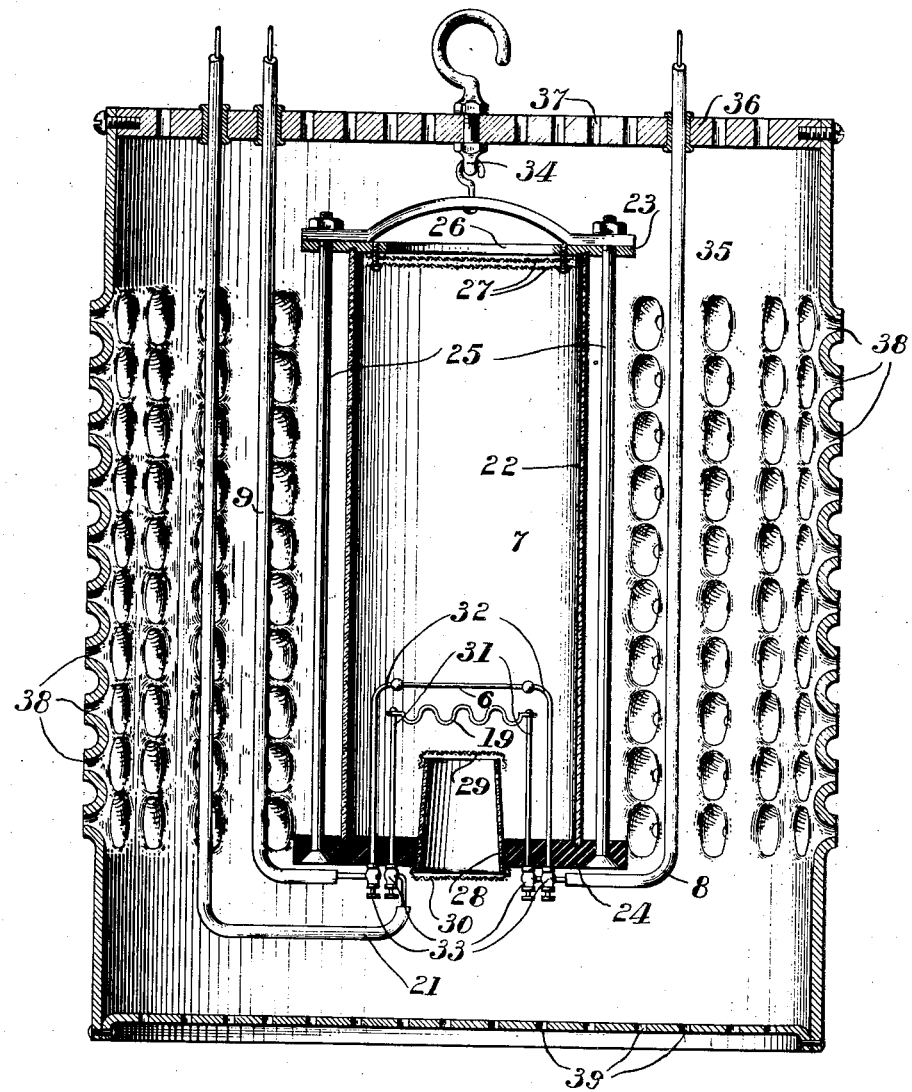

UNITED STATES PATENT OFFICE.

HAROLD H. CLARK, OF PITTSBURG, PENNSYLVANIA.

INDICATING AND MEASURING DEVICE FOR USE IN MINES OR WHEREVER DESIRED TO DETECT PRESENCE OF COMBUSTIBLE GASES.

960,823.

Specification of Letters Patent. Patented June 7, 1910.

Application filed April 5, 1910. Serial No. 553,662.

(DEDICATED TO THE PUBLIC.)

*To all whom it may concern:*

Be it known that I, HAROLD H. CLARK, a citizen of the United States, and an employee of the United States Geological Survey, Department of the Interior, residing at Pittsburg, county of Allegheny, State of Pennsylvania, have invented new and useful improvements in indicating and measuring devices for use in mines or wherever it is desired to detect the presence of combustible gases, and herewith make application for patent thereon under the act of March 3, 1883, chapter 143, No. 22 Statutes at Large, 625.

The invention herein described and claimed may be used by the Government, or any of its officers or employees in the prosecution of work for the Government or by any other person in the United States, without the payment of any royalty thereon.

The following is a full and exact description of my invention, reference being had to the accompanying drawings, which form a part hereof.

This invention relates to devices for measuring and indicating at a convenient point, as at the mouth of a mine, the exact percentage of combustible gas in the air, at various remote points.

The object of the invention is to provide a device of this character which will be sufficiently sensitive to give large readings on the indicator for relatively small percentages of explosive gas, and at the same time permit the use of standard instruments and be, on the whole, sufficiently rugged to withstand the use to which such a device would be subject in mine operations.

In the drawings Figure 1 shows diagrammatically a complete electric system embodying my invention. Fig. 2 is a side elevation partly in section of the instrument in this system which is affected by changes in the percentage of explosive gas.

Referring to Fig. 1, a source of constant potential is indicated at 1. Across this source at points 2, 2' is connected a Wheatstone bridge, one leg of which is constituted by the resistance elements 3, 4 which are equal and of any suitable value. The other leg of the bridge is formed by the resistance 5 and the active element 6 in any one of the responsive devices 7 which may be connected in circuit. The resistance 5 is preferably composed of manganin or other substance having a substantially zero temperature coefficient. The devices 7 are located throughout the mine or area to be tested at suitable intervals. The active element 6 is composed of a substance having, preferably, a high negative temperature coefficient such as is possessed by certain clays. One terminal of each of these elements is connected permanently or through a normally closed switch with one terminal 2' of the Wheatstone bridge. The other terminals of the active elements are connected by individual conductors 9, 10 and 11 with the terminal 15 of the resistance 5, through separate switches 12, 13 and 14.

An ordinary volt meter 16 is connected across the bridge between points 15 and 17 through a reversing switch 18. The reversing switch is to secure the deflection of the volt meter in the proper direction.

Each of the responsive devices 7 is provided with a heater 19 located immediately adjacent and preferably beneath the active element 6. These heaters may be formed of platinum wire covered by a coating of clay or may be of any known or suitable form, and are connected immediately across the source of constant potential through rheostat 20. In the drawing I have shown this connection accomplished by securing one terminal of the heater to that terminal of the active element which is connected to point 2' of the Wheatstone bridge while the other terminal of the heater is connected through conductor 21 with the other side of the circuit. It is obvious, however, that this connection may be formed by wires entirely separate from those of the active element or in any other suitable way which might suggest itself to one skilled in the art.

In Fig. 2 which illustrates the details of the responsive devices, 22 indicates a thin glass cylinder open at both ends and held between suitable plates 23 and 24 by bolts 25. The upper plate is provided with a large opening 26, over which is fastened a double layer of wire gauze 27. In a similar opening in the bottom plate is provided an upwardly projecting tube 28 which may be of glass. Both ends of this tube are covered with wire gauze indicated at 29 and 30. The gauze serves the well known purpose of preventing explosions within the instrument from being communicated to the atmosphere without. Tube 28 is for the purpose of directing the gas entering the device, against the heater 19 and active element 6. The heater and active element are supported on suitable posts indicated at 31, 32, which extend through the bottom plate and terminate in binding posts 33. The electrical conductors leading from these posts to the outside of the instrument are indicated at 8, 9 and 21. The bottom plate is preferably made of fiber to provide suitable insulation between the conductors passing therethrough. It is also desirable that all parts of the instrument adjacent the active element should be of as low specific heat as possible to prevent undue lagging of the indications behind the changes which give rise to them.

Suitable means are indicated at 34 for supporting the instrument within an inclosing casing. This casing is for the purpose of avoiding the objectionable action of drafts upon the instrument and as shown herein is of cylindrical form. The upper end 36 is made sufficiently heavy to support the weight of the device and may be perforated as indicated at 37. The sides and bottom of the cylinder, which may conveniently be made together from sheet metal and detachably secured to the top in any desired manner, are also provided with perforations 38, 39. As shown in the drawing, the perforations in the top and bottom of the cylinder may be in the usual form; those on the circumference are preferably located in a belt extending around the middle portion and are large on the inner and small on the outer surface of the cylinder. This form may be obtained by perforating the sheet metal with a punch of a form to force the metal outward around the perforations. This form of opening admits of free circulation and at the same time tends to dissipate the force of an air current tending to pass through the device due to drafts such as occur in mines.

The operation of the invention is as follows: Current is first turned through the heaters of the various instruments. This warms the active elements 6 until they reach a dull red heat. If, then, one of the switches 12, 13, 14 be closed so that current passes through the element 6, its resistance will fall until it becomes (due to its own heat and that from the heater) just equal to that of the resistance 5 of the Wheatstone bridge. Under these conditions there will be no indication given at the volt meter 16 since its terminals are connected to the points of equal potential as will be obvious. If the air circulating through the responsive device 7 contains any inflammable gas the combustion resulting at the heater and active element will cause a rise in temperature of the active element which will reduce its resistance. This will unbalance the Wheatstone bridge and cause a current to flow through the volt meter. Since the increase in the heat of the active element is proportional to the percentage of inflammable gas in the air and the increase in resistance is proportional to the heat, the volt meter will indicate the exact percentage of explosive gas at the point in the mine where the responsive instrument is located. The attendant in the mine office can, in this manner, ascertain immediately the exact condition of the air in any part of the mine by simply stepping to the switchboard and closing successively the switches in the circuits of the various instruments. The heaters will normally remain in circuit. The consumption of current in them is small and by keeping them hot time is saved in making the readings. If it is desired to test only at long intervals the heaters might be disconnected. It would then require a few moments after turning on the heater current before the readings could be made.

It will be seen that by using an active element with a high negative temperature coefficient I produce an instrument which is very sensitive to heat changes, and delicate instruments such as galvanometers are not necessary in taking the readings. Commercial voltages may therefore be used, but should be substantially constant. By this system it is found that deflections of 15 to 20 degrees may be obtained on standard volt meters for a mixture containing only 1% of gas. Since gas does not become explosive until it reaches about 4½% it will be seen that ample warning of the approach to dangerous conditions may be had.

What I claim is:

1. In an indicating and measuring device the combination with a source of substantially constant potential of an active element whose resistance changes with its temperature connected to receive current from said source and located at the point to be tested, a heater for said active element adapted to exert a constant heating effect thereon, means for preventing the heater and active element from igniting gas beyond their immediate vicinity, and means to measure changes in resistance of the active element.

2. In an indicating and measuring device, the combination with a source of substantially constant potential of a plurality of active elements having high negative temperature coefficients, a resistance having a substantially zero temperature coefficient, a switch for each active element adapted to connect it in turn across said source in series with said resistance to form one leg of a Wheatstone bridge, other resistances forming the other leg of the bridge, a volt meter connected across the bridge at points of normally equal potential for indicating changes in the resistance of the active elements; electric heaters located adjacent the active elements and connected across said source, means for protecting said heaters and active elements from drafts while permitting a free circulation of the gas to be tested, and means to prevent the ignition of gas beyond the immediate vicinity of the active elements.

3. A detecting instrument for use in gas testing systems comprising an inclosing vessel having a low specific heat and provided with openings at the top and bottom, wire gauze coverings for said openings, an active element having a high negative temperature coefficient suitably supported within the vessel, a heater supported immediately beneath the active element, electrical connections for the heater and active element, means for directing gas against the active element and means inclosing the vessel for protecting it from drafts while permitting a free circulation of the gas to be tested.

In testimony whereof I affix my signature in the presence of two witnesses.

HAROLD H. CLARK.

Witnesses:
A. W. BELDEN,
A. V. BLEININGER.